US006825752B2

(12) United States Patent
Nahata et al.

(10) Patent No.: US 6,825,752 B2
(45) Date of Patent: Nov. 30, 2004

(54) EFFORTLESS ENTRY SYSTEM AND METHOD

(75) Inventors: Pratik Kumar Nahata, Houston, TX (US); Tjarko Leifer, Stanford, CA (US); Edwin T. Li, Ellicott City, MD (US); Tejas B. Desai, Sterling Heights, MI (US); Susan A. Johnson, Rochester, MI (US); Mark Cutkosky, Palo Alto, CA (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 447 days.

(21) Appl. No.: 09/875,730

(22) Filed: Jun. 6, 2001

(65) Prior Publication Data

US 2001/0052839 A1 Dec. 20, 2001

Related U.S. Application Data

(60) Provisional application No. 60/213,003, filed on Jun. 21, 2000, and provisional application No. 60/211,068, filed on Jun. 13, 2000.

(51) Int. Cl.[7] .......................... G05B 19/00

(52) U.S. Cl. .................... 340/5.64; 340/5.61; 340/5.62; 340/5.72; 340/545.2; 340/545.3; 340/545.4; 307/10.1; 307/10.2; 180/273; 280/735

(58) Field of Search .................... 340/5.64, 5.61, 340/5.62, 5.72, 545.3, 545.4, 545.2; 307/10.1, 10.2; 180/273; 280/735

(56) References Cited

U.S. PATENT DOCUMENTS

| | | | | |
|---|---|---|---|---|
| 5,379,033 A | | 1/1995 | Fujii et al. | |
| 5,726,581 A | | 3/1998 | Vranish | |
| 5,770,997 A | | 6/1998 | Kleinberg et al. | |
| 5,929,769 A | * | 7/1999 | Garnault | 340/5.61 |
| 6,079,738 A | * | 6/2000 | Lotito et al. | 280/735 |
| 6,236,333 B1 | * | 5/2001 | King | 340/5.61 |

FOREIGN PATENT DOCUMENTS

| | | |
|---|---|---|
| DE | 40 06 119 A1 | 8/1991 |
| EP | 0 518 836 A1 | 12/1992 |
| EP | 0 823 520 A2 | 2/1998 |
| EP | 0 897 835 A2 | 2/1999 |
| EP | 0 955 431 A1 | 11/1999 |

OTHER PUBLICATIONS

European Search Report completed May 19, 2003.

International Search Report dated Dec. 21, 2000.

U.S. Provisional application Ser. No. 09/638,487, filed Aug. 14, 2000, entitled "Remote Keyless Entry System with Advanced Activation Features."

U.S. Provisional application Ser. No. 09/874,598, filed Jun. 5, 2001, entitled "Automatic Port Operation."

* cited by examiner

*Primary Examiner*—Arlo Etienne
*Assistant Examiner*—Yves Dalencourt

(57) ABSTRACT

The vehicle port control system has a capaciflective sensor, a port, a lock securing the port, and a control unit. The capaciflective sensor senses the presence of objects a predetermined distance from the vehicle port. The sensor communicates its readings to the control unit, which controls the actuation of the lock.

7 Claims, 3 Drawing Sheets

EFFORTLESS ENTRY SYSTEM AND METHOD

This application claims priority to Provisional Patent Application Ser. No. 60/211,068 filed on Jun. 13, 2000 and Provisional Patent Application Ser. No. 60/213,003 filed on Jun. 21, 2000.

BACKGROUND OF THE INVENTION

This invention relates to a method and system for passive vehicle entry that automatically locks and unlocks a vehicle port.

Many vehicles employ remote entry systems that permit a vehicle operator to lock and unlock the doors and trunk of the vehicle. Such systems usually comprise a transmitter located in a key device, say a key fob, and a receiver located in the vehicle. Upon activation by the driver, the key device fob transmits a key code to the receiver. A control unit then compares the key code to a security code to determine whether the key code matches the security code. In the event of a match, the control unit locks or unlocks the vehicle.

Such systems require the driver to manually activate the transmitter, providing less convenience of operation. When the driver's hands are occupied, such as when carrying bags, the driver must free his hands to lock and unlock the vehicle. This limitation is undesirable.

Passive systems do exist that permit the driver to lock and unlock the vehicle without activating the transmitter within a key fob. Such systems use capacity sensors located in a car's door handle that communicate with a control unit in the car. When the control unit senses the presence of the hand lifting the handle, the control unit sends a challenge to a key device carried by the individual to determine whether the individual is authorized to unlock the door. The key device responds to the challenge by transmitting a key code. The control unit determines whether the key code is, in fact, the correct code. If so, the control unit unlocks the vehicle automatically.

Current capacitive systems essentially work as touch sensors. As a consequence, the vehicle security system has very limited time to respond to the touch of the operator and unlock the vehicle port, say car door. Sometimes the operator may touch and lift the handle so quickly that the system will have not authorized entry prior to the handle hitting the end of its path of travel. In such an instance, the authorized operator will have tugged the handle without automatic actuation of the vehicle lock.

A need therefore exists for a passive entry system that provides greater advanced notice to the vehicle security system of the operator's intention to unlock the vehicle door.

SUMMARY OF THE INVENTION

The invention comprises a port control system that employs a capaciflective sensor to detect the presence of objects at a greater range than current capacitance sensors. Such sensors provide improved advanced notice to vehicle security systems of the approach of a vehicle operator toward a vehicle door or trunk, thereby permitting the security system to check the operator for entry authorization even prior to touching the door or trunk latch. Thus, the current system is transparent to the operator, who may seamlessly and smoothly open the vehicle port without any delay caused by security clearance.

The vehicle port control system comprises a capaciflective sensor, a lock securing a port such as a door or trunk, and a control unit. The capaciflective sensor is set to sense for objects, such a human hand, at a predetermined distance from the door or trunk. Such sensors may be set to detect for the presence of objects from six to eight centimeters from the vehicle latch, significantly improving on the range of current sensors. The system may also include an electronic key device, such as a key fob.

Once an object is detected within the range of the capaciflective sensor, the control unit determines whether the operator is authorized for entry. If so, the control unit actuates the lock. The control unit may determine authorization by requesting a key code from the key fob. In response to this challenge, the key fob then transmits this code to the control unit, which then compares the key code to an unlocking code. If there is a match, the control unit unlocks the lock. The request for the key code may occur when the object is sensed within the range of the sensor.

The invention may also be combined with other vehicle subsystems such as a power vehicle seat system, the vehicle sound system, or air conditioning system. The control unit may then set these systems to the personal setting of the particular operator.

To avoid actuating any lock before the operator truly intends to open the vehicle port, the system may also be combined with a latch sensor. Movement of the latch signifies to the control unit that it should unlock the vehicle port. Prior to this actuation by the operator, the system remains on standby with authorization already cleared. The latch sensor may be an infrared sensor.

The system may also be set to "tune out" rain, snow, and other environmental conditions that may otherwise trigger the invention to commence searching for proper authorization. The system accomplishes this task by comparing the signal from the capaciflective sensor with a predetermined threshold. This threshold may be attuned to trigger the search for authorization upon detection of a person or a portion of the person within the range of the capaciflective sensor.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
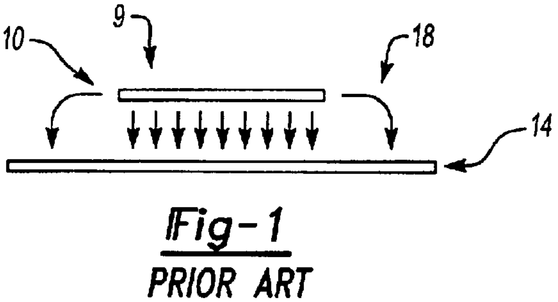
Fig-1 PRIOR ART
FIG. 1 shows a capacitance touch sensor as known in the art.

Current passive entry systems employ capacitance or "touch" sensors. As illustrated in FIG. 1, such a sensor 9 has sense element 10 spaced a distance from shielded metal surface 14, such as the car door panel. Sense element 10, a conductive surface, is charged to create an electric potential between sense element 10 and shield metal surface 14. Electric field 18 is created between the two surfaces. A dielectric material, such as air or other insulator, exists between the two surfaces. If the dielectric remains constant, the capacitance also remains constant. If the dielectric changes, the capacitance also changes. In capacitive proximity sensors, the two surfaces or electrodes are coupled together and integrated in a high frequency oscillator. As an object enters the electric field, thereby increasing capacitance, oscillation begins. When the amplitude is sufficiently high, the object is detected as a “touch”. This “touch” is then read by a control system as an indication of the operator’s intent to open a port such as a door.

Figure 2:
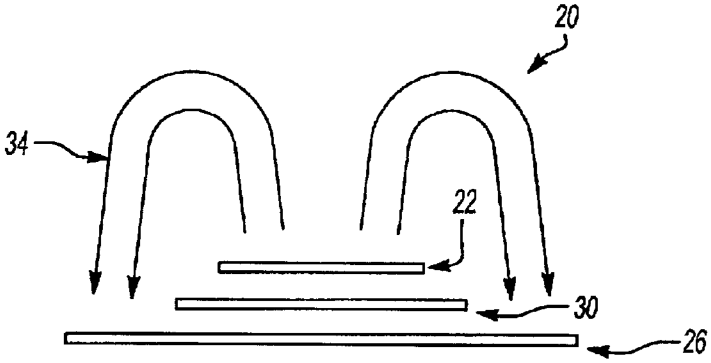
Fig-2 PRIOR ART
FIG. 2 illustrates a capaciflective sensor as known in the art.

The present invention employs a capaciflective sensor as known in the art and illustrated in FIG. 2. Like capacitance sensor 9, capaciflective sensor 20 employs sense element 22, a conductive surface, and shielded metal surface 26, another conductive surface such as a car door panel. A voltage difference exists between the two surfaces. However, in addition to these two surfaces, capaciflective sensor 20 has actively shielded layer 30 positioned between the two surfaces. Actively shielded layer 30 is a conductor having a voltage about the same as the voltage of sense element 22. As a consequence, actively shield layer 30 causes electric field 34 to extend from sense element 22 and around actively shield layer 30 ultimately to shield metal surface 26, which acts as ground. Objects in electric field 34 will change the field, causing a change in the dielectric constant and capacitance, which may be read as the presence of an object. This type of sensor is known but has not been used in connection with port locking systems.

Figure 3:
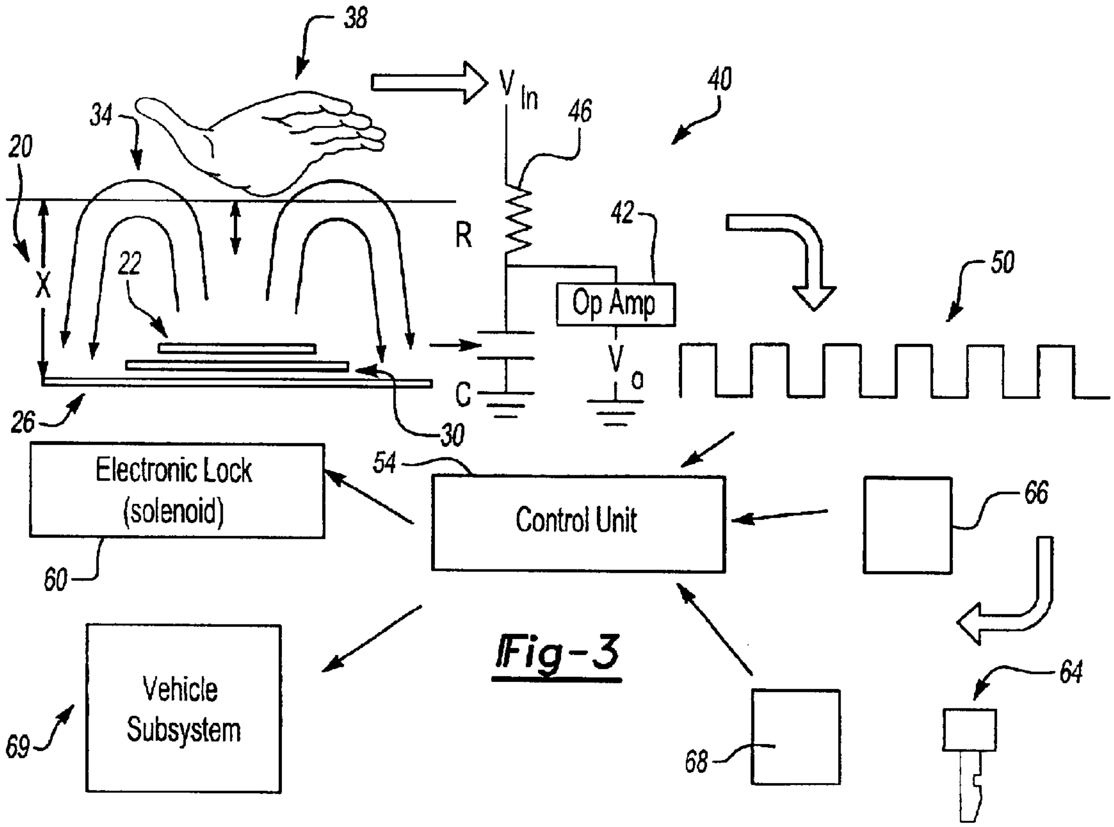
FIG. 3 illustrates an embodiment of the invention, employing the capaciflective sensor of FIG. 2 with a vehicle port and lock system.

FIG. 3 illustrates the invention, a vehicle port control system. As described above, capaciflective sensor 20 senses object 38, such as a hand, predetermined distance X away from shield metal surface 26, a vehicle port such as a door panel or trunk. Capaciflective sensor circuit 40 may comprise operational amplifier 42 in conjunction with resistor 46. Operational amplifier 42 is used to maintain about the same voltage between sense element 22 and actively shielded layer 30 thereby propagating electric field 34. As known, the presence of object 38, such a hand, causes the electric field to change and alters the capacitance of capaciflective sensor 20.

This change in capacitance may be determined in the following manner. Capaciflective sensor 20 and resistor form an RC circuit with a frequency of 1/RC. This frequency changes with the change in capacitance. Operational amplifier 42 outputs signal 50, which has a frequency related to 1/RC. Signal 50 is then communicated to control unit 54.

Control unit 54 compares the detected frequency with a predetermined threshold. For a particular size of capaciflective sensor and particular surrounding environment, the frequency of capaciflective sensor circuit 40 is more or less constant. Hence, the predetermined threshold is preferably calculated as the difference between the particular environmental condition’s frequency and the frequency when a user is near the sensor. The predetermined threshold may be set in the software and hence can be changed, thereby making the range of detection adjustable from a maximum value (which is limited by the sensor construction) to a minimum value (at distance=0 such that the proximity sensor is now a touch sensor). Frequency counter and comparator circuit 42 within control unit 54 assists in comparing the frequency of signal 50 from capaciflective sensor circuit 40 with this predetermined threshold. The sampling is done in milliseconds. The software counts the number of waves every millisecond and compares the detected frequency with the predetermined threshold.

The moment the frequency of the capaciflective sensor circuit 40 dips below the predetermined threshold, control unit 54 responds by searching for vehicle entry authorization. Essentially, control unit 54 concludes the detection of the object as an intention of an operator to actuate lock 60, such as an electronic solenoid lock, and transmits a challenge signal to determine whether the operator is authorized to operate the vehicle. As known, electronic key device 64, such as a key fob or electronic badge within the vicinity of the challenge signal, responds to the challenge signal through a transponder and transmits a key code to control unit 54. If key code matches a security code stored by control unit 54, it may unlock vehicle then. It is preferable, however, that control unit 54 determines whether the port is already open by position sensor 66. Moreover, control unit 54 may also seek to determine whether operator has moved latch 68 to further indicate the operator’s intention to enter the vehicle. The latch may be a door handle or a trunk release. If the port is closed and latch 68 has been moved, then at this moment, control unit 54 may actuate lock 60. Movement of latch 68 may be detected by a latch sensor such as an infrared sensor.

The invention may also be combined with vehicle subsystem 69 such as a power vehicle seat system, the vehicle sound system, or air conditioning system. The control unit may then set these systems to the personal setting of the particular operator. In this way, the invention may tailor the vehicle environment to suit the particular needs of the authorized operator.

Capaciflective sensor 20 may comprise a two-sided copper printed circuit board that has two electrically separated conducting sides: one side may function as sense element 22 while the other side may serve as actively shielded layer 30. It is very important that the two layers remain electrically insulated from each other.

Another approach involves forming a piece of plastic to the shape and contour of the door handwell and then coating both sides with conductive paint. Conductive epoxy is used to affix two leads, one for the shield and the other for the sense plate. This structure fits into the door handle.

Still, a capaciflective sensor may also be formed by masking tape serving as a base for the actively shielded layer with another layer of masking tape on the shield serving as the insulating layer. The surface of the insulating layer may be sprayed with conductive paint to form the sensing element.

To a degree, the detection range of sensor 20 may be adjusted by increasing and decreasing the size the sense element 22 and actively shield layer 30. Increasing the size generally increases the range while decreasing the size decreases the range. Because the sensor’s range depends on the size of the sensing element, calibration must be done to limit the range of detection to the 6–8 cm region to avoid excessive high power challenge signal transmissions from the vehicle, which will drain the vehicle’s battery.

Figure 4:
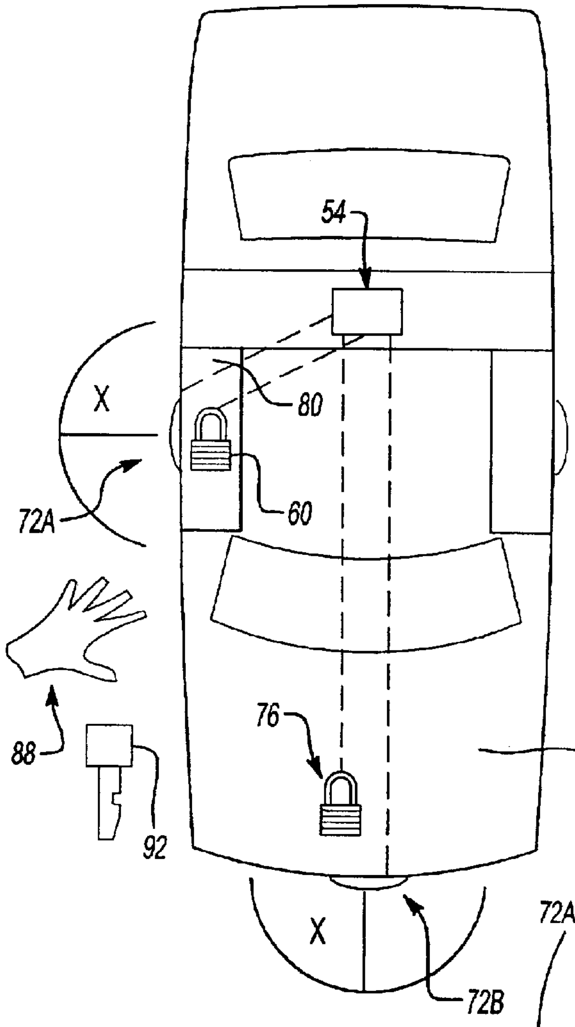
FIG. 4 shows the invention in its environment in a vehicle.

FIG. 4 shows the invention in its environment. Vehicle 70 has port 80 and trunk 84. It is preferable to locate capaciflective sensor 20 about a latch, such as a door handle or trunk release, because movement of the operator’s hand in this direction will generally evince an intention to unlock and open the vehicle port. Here, capaciflective sensor 72A takes the form of a door latch while capaciflective sensor 72B takes the form of a trunk latch. Both sensors 72A and 72B communicate with control unit 54, which itself controls lock 60 and lock 76. Object 88, such as a hand, is outside predetermined distance X, which results in no action by control unit 54.

Figure 5:
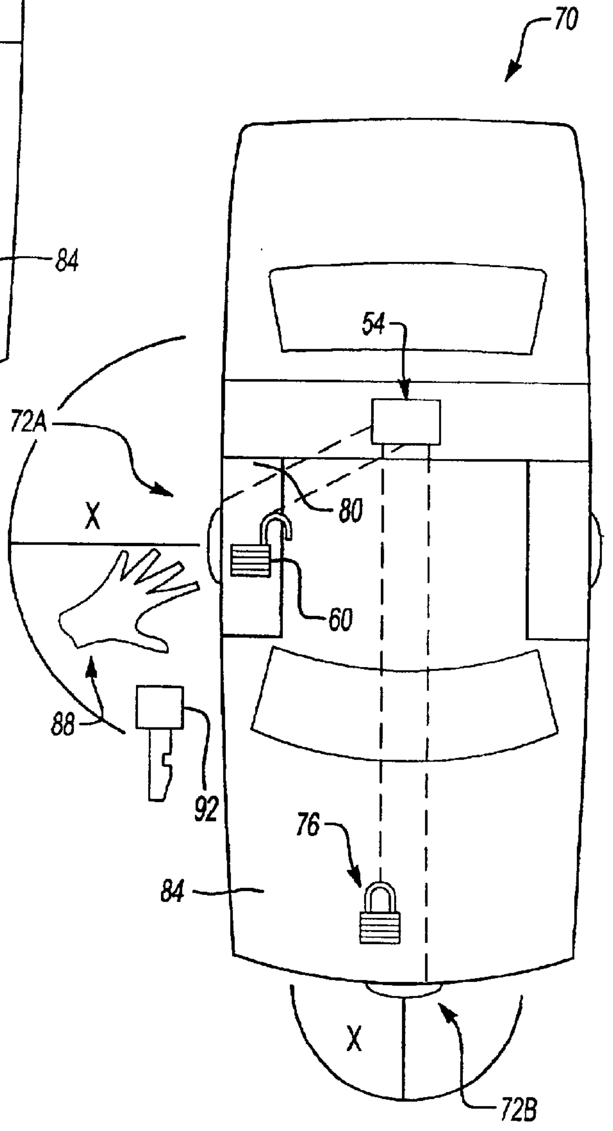
FIG. 5 shows the invention of FIG. 5 with a lock actuated.
Figure 6:
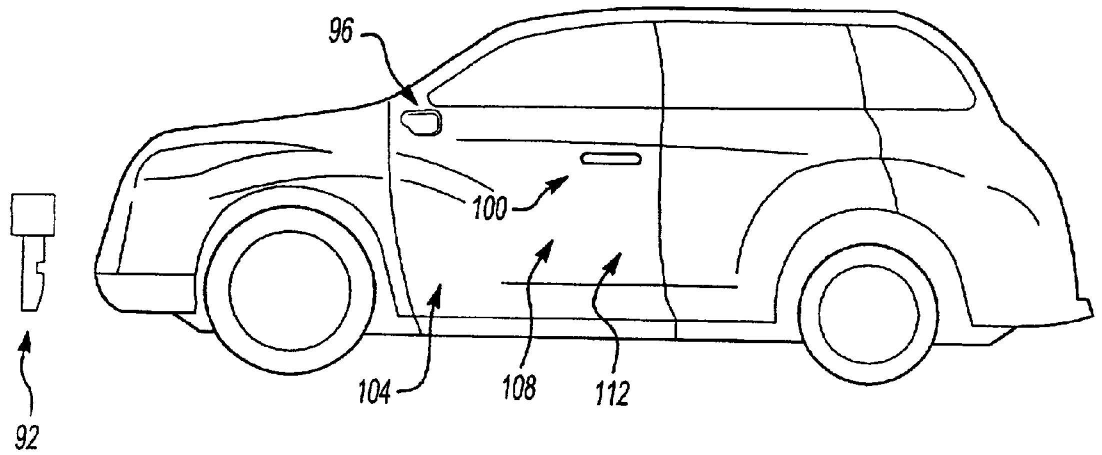
FIG. 6 illustrates various locations for the placement of an antenna that may be employed with the invention.

As shown in FIG. 5, when object 88 enters predetermined distance X as detected by capaciflective sensor 72A, then control unit 54 responds to presence of object 88. As described above, control unit 54 may request a key code from the operator by sending an electronic challenge to electronic key device 92, which may or may not be within predetermined distance X. If control unit 54 determines key code matches a security code, then control unit 54 actuates lock 60 as seen in FIG. 6. Electronic lock 76 securing trunk 84 may be actuated in the same manner. As shown in FIG. 6, electronic key device 92 may transmit a key code to control unit 54 through an antenna placed on port, such as on side view mirror 96, latch 100, door panel 104, side door panel 108, or lower edge of door panel 112.

The aforementioned description is exemplary rather then limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A vehicle port control system comprising:

a capaciflective sensor for generating an electric field for sensing an object a predetermined distance about a vehicle port;

a lock for securing the port;

a latch for controlling opening and closing of said port; and a control unit in communication with said capaciflective sensor, said control unit for controlling the actuation of said lock;

wherein said latch includes a sensor in communication with said control unit, said sensor for detecting movement of said latch.

2. The vehicle port control system of claim 1 wherein said sensor is an infrared sensor.

3. A vehicle port control system comprising:

a vehicle port;

a capaciflective sensor for generating an electric field for sensing an object a predetermined distance about said port;

a latch controlling opening and closing of said port; and a control unit in communication with said capaciflective sensor, said control unit for comparing a signal from said capaciflective sensor with a predetermined threshold;

wherein said latch includes a sensor in communication with said control unit, said sensor for detecting movement of said latch.

4. A method of port control comprising the steps of:

establishing a voltage on a first surface;

establishing about the same voltage on a second surface spaced from the first surface;

establishing a lower voltage on a third surface spaced from the second surface, thereby propagating an electric field from the first surface, around the second surface, and to the third surface;

sensing changes in the electric field caused by the presence of an object in the electric field;

generating an electric signal based on the changes in the electric field;

comparing the electric signal to a predetermined threshold; and controlling a port based on the comparison.

5. A vehicle port control system comprising:

a capaciflective sensor for generating an electric field for sensing an object a predetermined distance about a vehicle port;

a lock for securing the port; and a control unit in communication with said capaciflective sensor, said control unit for controlling the actuation of said lock;

wherein said capaciflective sensor comprises a first surface, a second surface and a third surface, said first surface having a first voltage about the same as a second voltage on said second surface, said third surface having a third voltage lower than said first surface.

6. The vehicle port control system of claim 5 wherein said second surface is spaced between said first surface and said third surface.

7. A vehicle port control system comprising:

a capaciflective sensor for generating an electric field for sensing an object a predetermined distance about a vehicle port;

a lock for securing the port; and a control unit in communication with said capaciflective sensor, said control unit for controlling the actuation of said lock;

wherein said capaciflective sensor is oriented to direct the electric field away from said lock.

* * * * *